United States Patent
Andrus et al.

(10) Patent No.: US 8,249,410 B2
(45) Date of Patent: Aug. 21, 2012

(54) CONNECTOR HOUSING FOR A COMMUNICATION NETWORK

(75) Inventors: Scott F. Andrus, Hickory, NC (US); Chois A. Blackwell, Jr., North Richland Hills, TX (US); Brian D. Kingsbury, Watauga, TX (US); Daniel S. McGranahan, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 189 days.

(21) Appl. No.: 12/236,597

(22) Filed: Sep. 24, 2008

(65) Prior Publication Data

US 2009/0269019 A1 Oct. 29, 2009

Related U.S. Application Data

(60) Provisional application No. 61/125,467, filed on Apr. 25, 2008.

(51) Int. Cl.
*G02B 6/00* (2006.01)

(52) U.S. Cl. .................................................... 385/135

(58) Field of Classification Search ........... 385/134–136
See application file for complete search history.

(56) References Cited

U.S. PATENT DOCUMENTS

| 5,265,186 | A | 11/1993 | Fishkin et al. | 385/135 |
| 6,195,493 | B1 * | 2/2001 | Bridges | 385/134 |
| 6,222,975 | B1 | 4/2001 | Gilbert et al. | 385/134 |
| 6,334,006 | B1 | 12/2001 | Tanabe | 385/12 |
| 6,370,294 | B1 * | 4/2002 | Pfeiffer et al. | 385/16 |
| 6,822,874 | B1 * | 11/2004 | Marler | 361/752 |
| 6,944,389 | B2 | 9/2005 | Giraud et al. | 385/135 |
| 6,993,237 | B2 | 1/2006 | Cooke et al. | 385/135 |
| 7,200,316 | B2 | 4/2007 | Giraud et al. | 385/135 |
| 7,376,323 | B2 * | 5/2008 | Zimmel | 385/135 |
| 7,587,116 | B2 * | 9/2009 | Scadden | 385/135 |
| 2007/0242420 | A1 | 10/2007 | Hoshino et al. | 361/600 |

FOREIGN PATENT DOCUMENTS

WO WO2005/106556 A1 11/2005

* cited by examiner

*Primary Examiner* — Eric Wong
(74) *Attorney, Agent, or Firm* — Russell Scott Magaziner

(57) ABSTRACT

A connector housing for use with a communication network and management system thereof includes a housing having a plurality of berths each configured to receive an optical connector adapter unit. A housing electrical connector is associated with each berth and faces the front of the housing to engage an adapter unit electrical connector as the adapter unit is inserted into the berth. Guide elements guide and align the housing electrical connectors with the adapter unit connectors as the adapter units are inserted into the berth to allow blind mating of the housing electrical connectors and the adapter unit connectors. Electrical contacts from at least two housing electrical connectors are consolidated into a cable connector positioned adjacent the back of the housing.

21 Claims, 16 Drawing Sheets

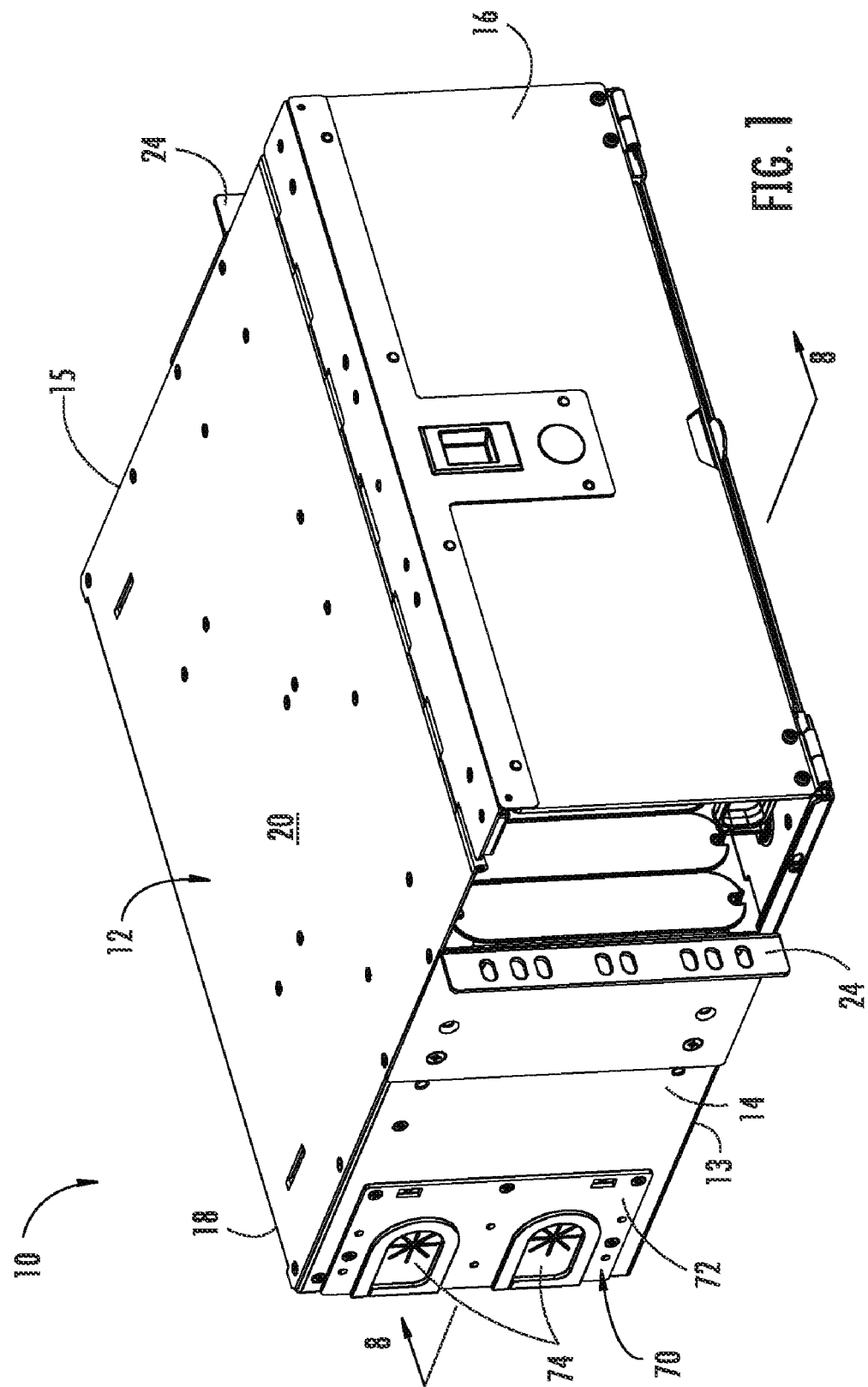

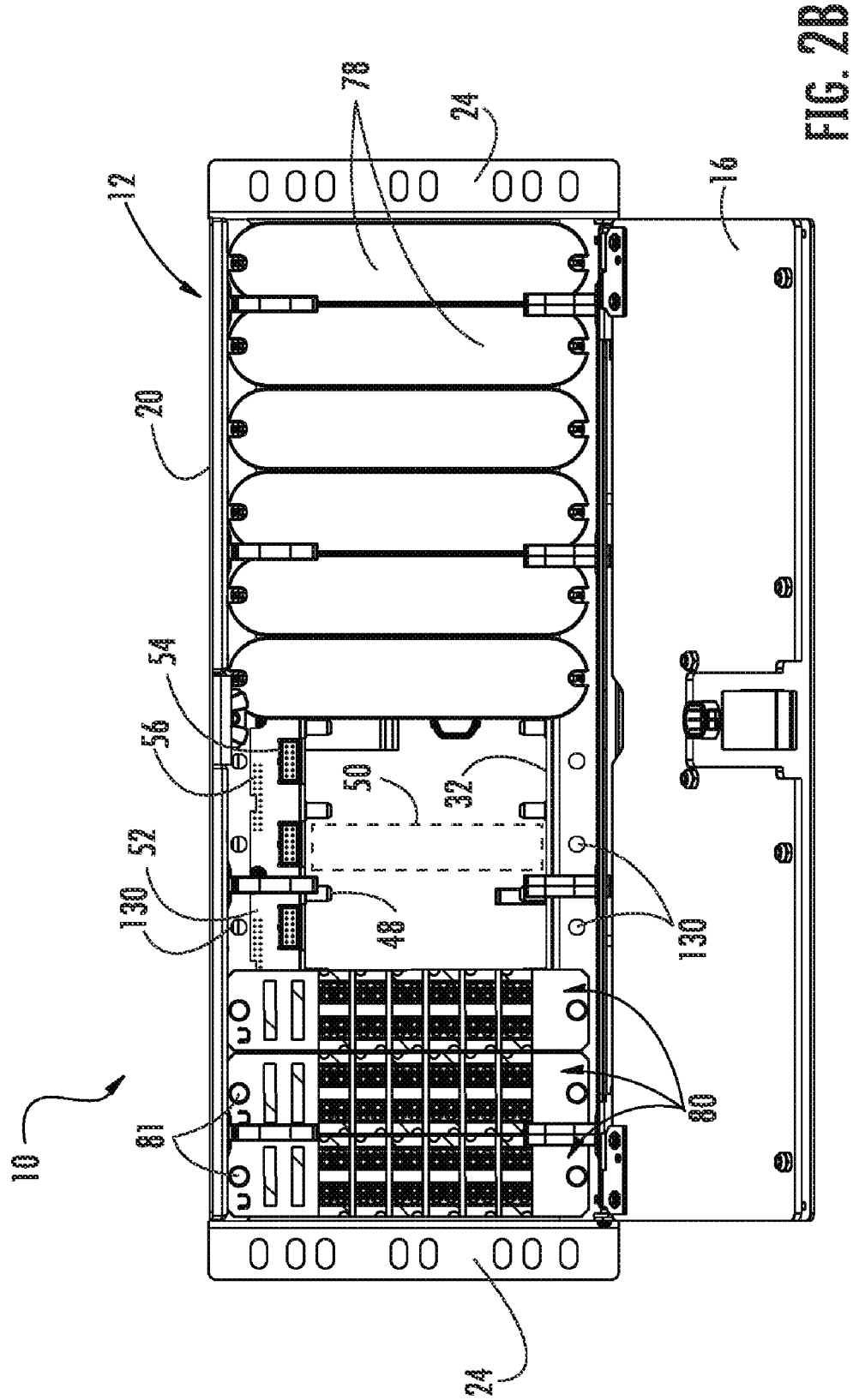

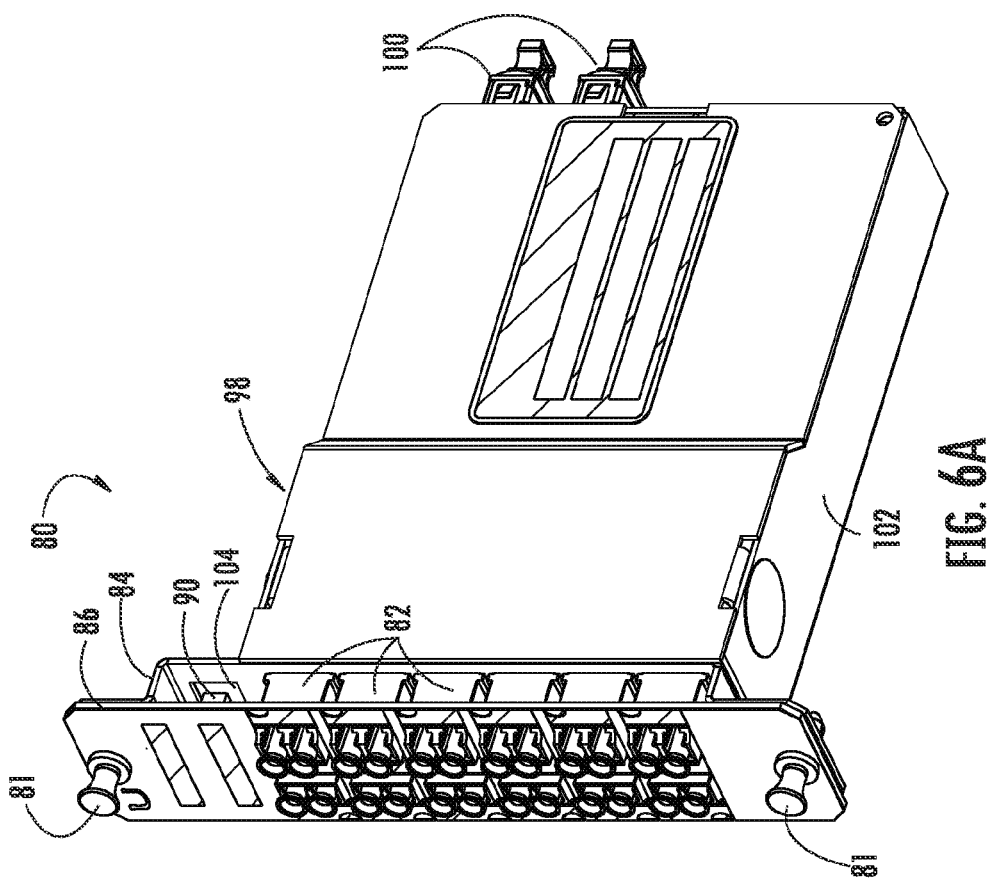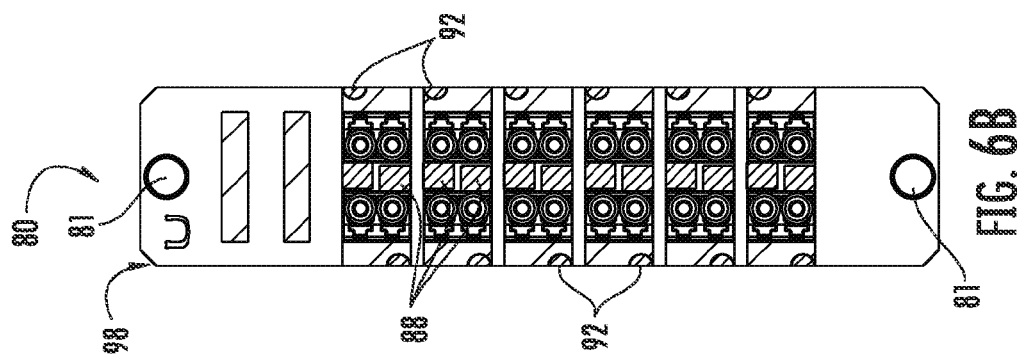

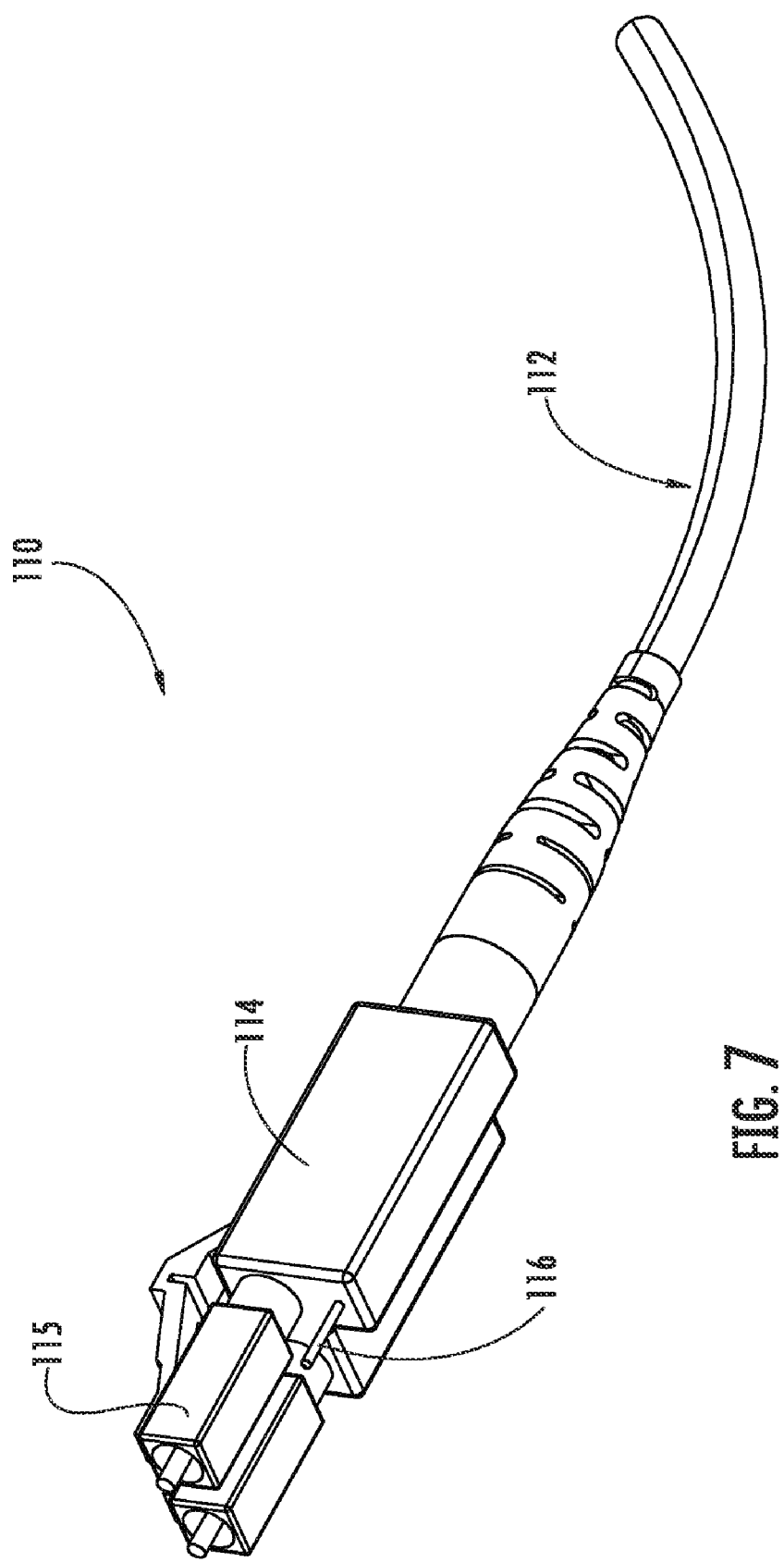

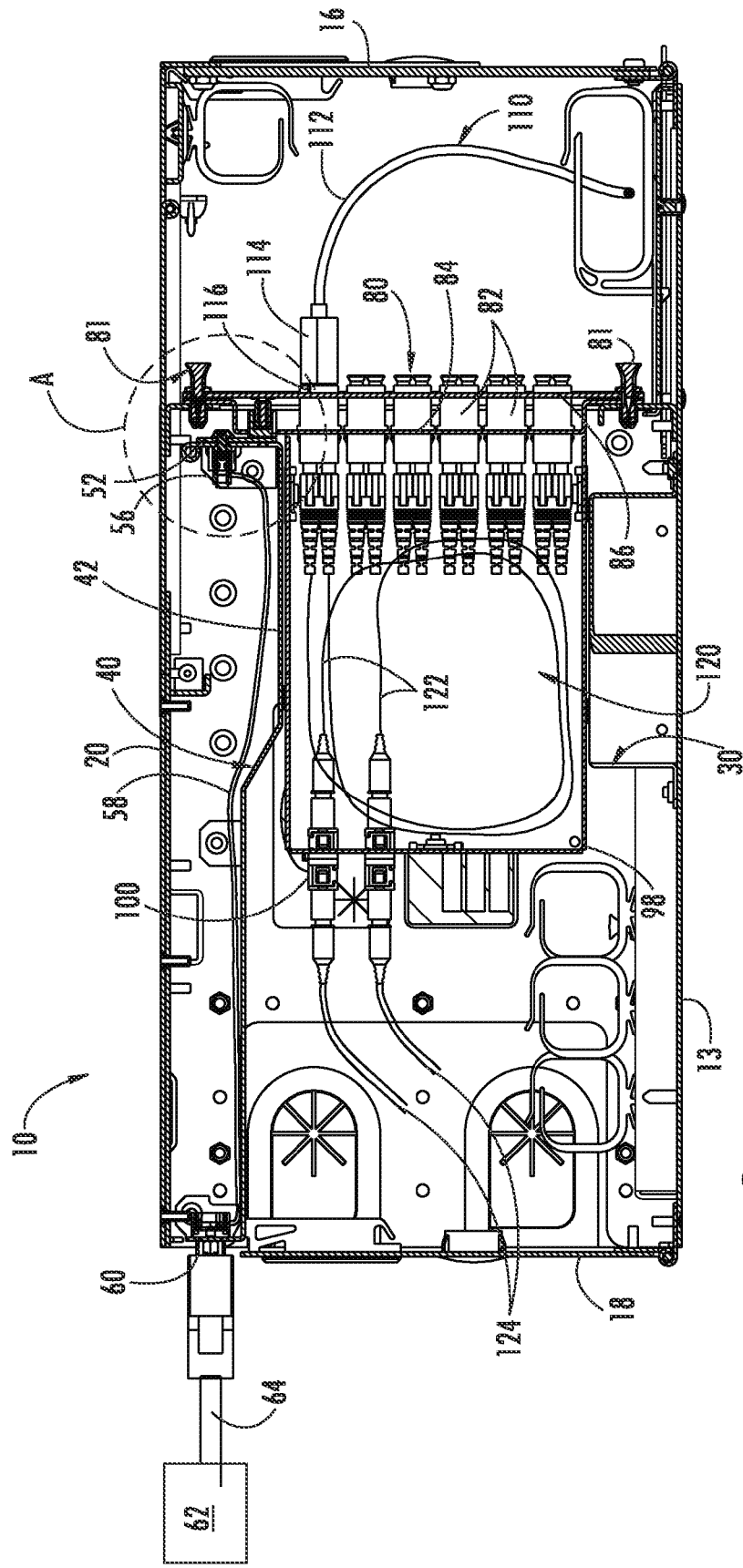

CONNECTOR HOUSING FOR A COMMUNICATION NETWORK

CROSS REFERENCE TO RELATED APPLICATION

The present application claims priority to U.S. Provisional Patent Application Ser. No. 61/125,467, filed on Apr. 25, 2008 and entitled "CONNECTOR HOUSING FOR A COMMUNICATION NETWORK," which is incorporated herein by reference in its entirety.

FIELD

The present invention relates generally to a connector housing for organizing, routing, and storing optical connections such as splices and/or connectors between optical waveguides, and more specifically to such a connector housing for use with communications network management systems.

BACKGROUND

With the advent of cheap computing and sophisticated communication systems, communication network systems are progressively becoming more complex and more difficult to manage. For example, in a typical office building, several types of communication lines (e.g., telephone twisted pair wiring, local area network (LAN) and ethernet cables) may run from individual offices to a central wiring closet on the same floor. The communication lines from these closets on each floor may then run through a backbone to a data-center serving the entire building. Organizing, maintaining, and trouble-shooting these hundreds and perhaps thousands of communication lines is a significant challenge.

In such communication infrastructure installations, equipment for switching, cross-connecting and inter-connecting a variety of devices are used. Many of these devices are installed in equipment racks, thereby permitting organized, high-density installations in a limited space. For instance, patch panels may be conveniently used as a central point of termination of communication lines connecting equipment or coupling together different devices, thereby allowing a craftsman access to multiple connections at a single location to perform maintenance and/or reconfigure the communication network as necessary.

During maintenance and/or reconfiguration of a communication network, patch cables and connections are often relocated, added, removed or changed. When using a large number of patch cables, it can become very difficult to identify the initiating and terminating ends of a particular patch cable. Thus, documenting changes made to the patch cables and connections is important to assure that the communication network can be properly maintained and/or reconfigured in the future. Accordingly, "intelligent" communication network management systems are being developed that detect and track the numerous connections within a communication network. There is an ever growing need for reliable and scalable patch panel management architecture for use with intelligent communication network management systems.

SUMMARY

One aspect of the invention provides a connector housing for a communications network. In one embodiment, the housing comprises a housing assembly having an interior defined by a first side panel, a second side panel, a bottom panel, and a top panel, the interior having a plurality of berths therein, wherein each berth is configured to receive an adapter unit inserted from a front of the housing assembly; a housing electrical connector associated with each berth, each housing electrical connector facing the front of the housing assembly and configured to engage an adapter unit electrical connector as the adapter unit is inserted into the berth; guide elements configured to guide and align the housing electrical connectors with the adapter unit connectors as the adapter units are inserted into the berth, the guide elements configured to allow blind mating of the housing electrical connectors and the adapter unit connectors; and at least one cable connector positioned adjacent a back of the housing assembly, the cable connector in electrical communication with and consolidating electrical contacts from at least two housing electrical connectors.

Another aspect of the invention provides a communication network management system. In one embodiment, the system comprises a connector housing and an adapter unit having on a front side thereof a plurality of adapters for making optical connections with optical waveguides, and wherein the adapter unit electrical connector is in electrical communication with a plurality of contact pads on the front side of the adapter unit, each of the plurality of contact pads associated with a corresponding one of the plurality of adapters.

Yet another aspect of the invention provides a retrofit kit for a communication network connector housing. In one embodiment, the kit comprises a sub-assembly configured for installation within a connector housing, the sub-assembly supporting a first plurality of electrical connectors at a front side thereof, the first plurality of connectors consolidated by a cable to a lesser number of electrical connectors configured for positioning at a back side of the connector housing.

Additional features will be set forth in the description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description present embodiments according to the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments according to the invention and together with the description serve to explain the principles and operations of the invention.

BRIEF DESCRIPTION OF THE DRAWINGS

FIG. 1 is a front perspective view of one embodiment of a connector housing according to the present invention.

FIG. 2B is a front view of the connector housing of FIG. 1 having the front panel in an open position.

FIG. 6A is a front perspective view of one embodiment of an adapter module according to the invention.

FIG. 6B is a front view of the adapter module of FIG. 6A.

FIG. 7 is a perspective view of one embodiment of a patch cable for use with the adapter units of FIGS. 5A-6B.

FIG. 8 is a cross-sectional view of the connector housing of FIGS. 1-4B, taken generally along line 8-8 of FIG. 1.

DETAILED DESCRIPTION

Figure 2A:
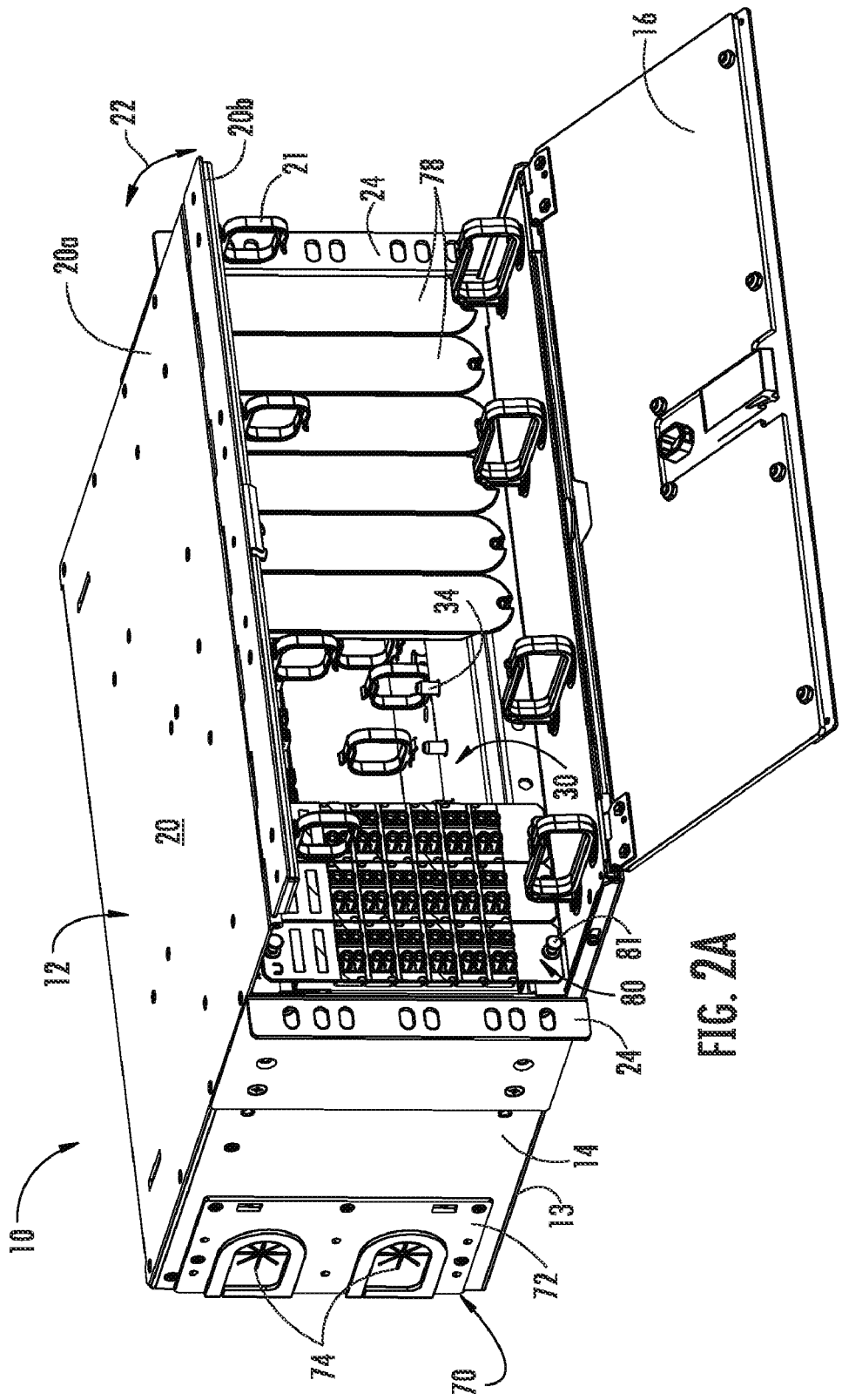
FIG. 2A is a front perspective view of the connector housing of FIG. 1 having the front panel in an open position.

Reference will now be made in detail to embodiments according to the invention, examples of which are illustrated in the accompanying drawings. Whenever possible, the same reference numerals will be used throughout the drawings to refer to the same or like parts.

For purposes of description herein, the terms "upper," "lower," "right," "left," "rear," "front," "vertical," "horizontal," and derivatives thereof generally relate to the illustrated embodiments as oriented in the figures. However, it is to be understood that the embodiments may assume various alternative orientations and step sequences, except where expressly specified to the contrary. It is also to be understood that the specific devices and processes illustrated in the attached drawings and described in the following specification are embodiments of the inventive concepts defined in the appended claims. Hence, specific dimensions and other physical characteristics relating to the embodiments disclosed herein are not to be considered as limiting, unless the claims expressly state otherwise.

As used herein, the term "out-of-band" (as in "out-of-band communication", "out-of-band conductor", "out-of-band signal", etc.) is broadly understood to refer to communication that occurs outside or separate from the data stream being transferred over a communication network, and also the components (e.g., connectors, conductors, etc.) used to accomplish out-of-band communication.

As used herein, the term "adapter unit" is broadly understood to refer to adapter panels and adapter modules, including but not limited to, patch panels and modules.

In one embodiment of an intelligent communication network management system, adapter units such as patch panels/modules are conveniently used as a central point of termination of wiring to connect to equipment or to couple together different devices. In one embodiment, each individual port on an adapter unit has a corresponding "out-of-band" connection used to determine port level connectivity. The out-of-band connections of one or more adapter units are connected to a signal processor/analyzer that polls individual ports on each adapter unit via the corresponding out-of-band connection to determine port level connectivity. If no signal is detected in response to a signal being placed upon the out-of-band connection corresponding to a specific port, the analyzer then determines that the port upon which the signal is placed is not in use.

In one embodiment, the out-of-band connection is an electrical connection that includes a conducting pad adjacent to or within each port. Each out-of-band conducting pad is connected, internally within the adapter unit, to a separate pin of a multi-pin connector on the back of the adapter unit. The multi-pin connector is then connected to a monitoring cable that is in electrical communication with a signal processor/analyzer.

Patch cables used with the system include network communication lines (i.e., optical and/or electrical) that support network data communication (i.e., "in-band" communication) and an additional out-of-band conductor that supports the out-of-band signals for determining port level connectivity.

A panel controller module (e.g., a signal processor/analyzer) may include a processor module in communication with a data storage module, a network interface module and a plurality of port controller modules to receive port status updates.

The intelligent communication network management system described herein may be applied to any deployed network infrastructure that may benefit from the use of adapter units and may be integrated within any network connected device, including but not limited to a switch, a router, a computer, a server, a network connected data repository, an end-user device such as a printer, a workstation, and a hand-held computing device. The system may be implemented in any number of hardware and software modules and is not limited to any specific hardware/software module architecture. Network management system processes associated with the adapter unit/patch cable connection monitoring processes may be integrated within a stand-alone system or may execute separately and be coupled to any number of devices, workstation computers, server computers or data storage devices via any communication medium (e.g., network, modem, direct connection, etc.). Beneficially, the intelligent communication network management system provides scalability and allows optimum use while minimizing costs by allowing the user to add adapter units, such as patch panels and modules, to the system based on current and future needs of the customer.

Referring now to FIGS. 1-4B, an exemplary connector chassis or housing 10 is illustrated. Connector housing 10 is typically mounted to an equipment rack (not shown) and used for organizing, routing, protecting, and storing optical connections and cables of a communication network. Connector housing 10 includes housing assembly 12 having a bottom panel 13, a first side panel 14, a second side panel 15, a front panel 16, a rear panel 18, a top panel 20, and a pair of rack mounts 24. The panels and sides of housing assembly 12 generally define an interior space of connector housing 10. Front and rear panels 16, 18 are rotatable from latched closed positions (FIGS. 1 and 8) to open positions (FIGS. 2A-4B), thereby allowing the craftsman access to the interior space respectively from both the front and the rear. Of course, other configurations of the connector housing are possible and intended.

Figure 3:
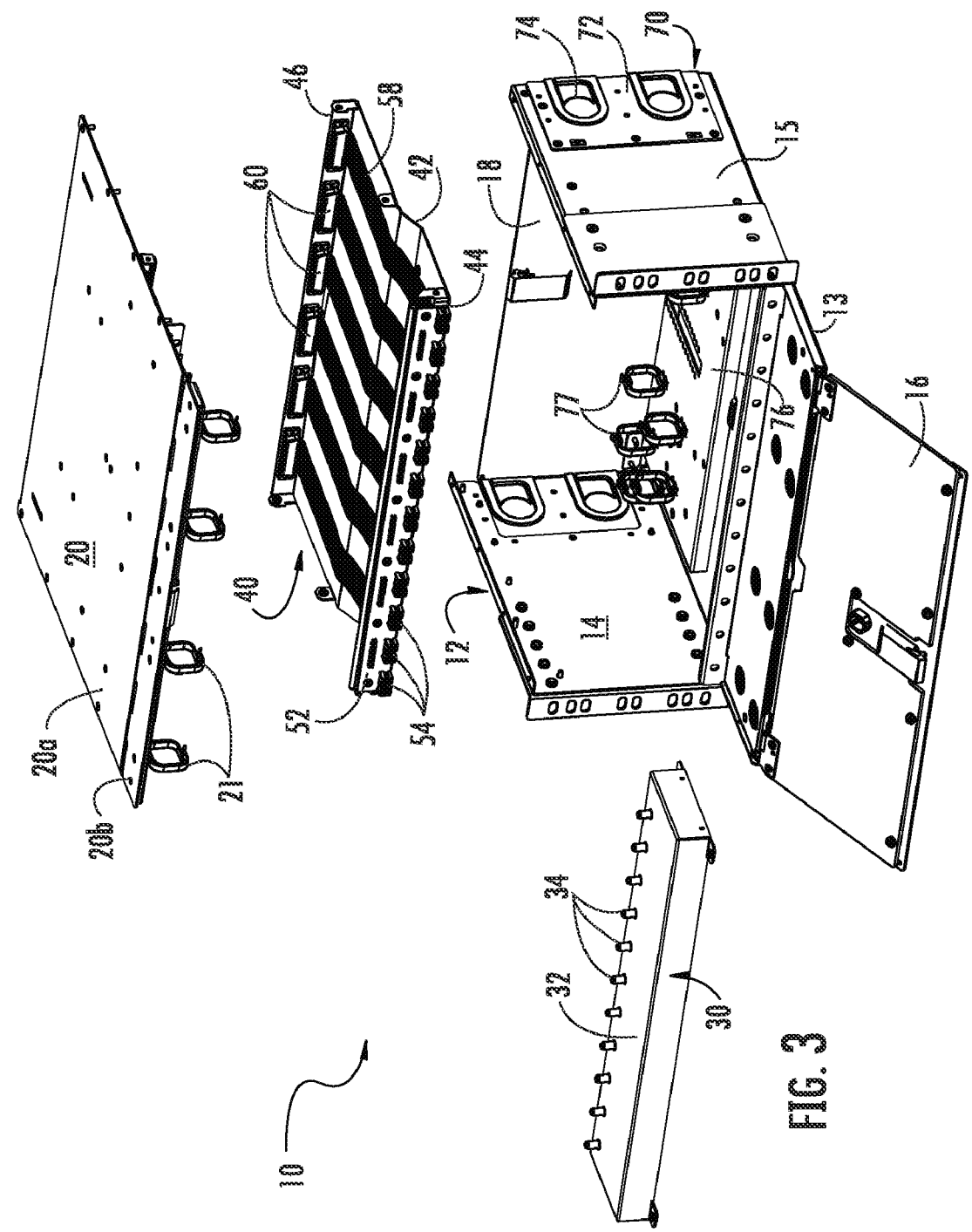
FIG. 3 is a front perspective, partially exploded view of the connector housing of FIG. 1.

As best seen in the exploded view of FIG. 3, embodiments of the connector housing 10 may include a floor sub-assembly 30. Floor sub-assembly 30 is attached to housing assembly 12 adjacent bottom panel 13. Any suitable fasteners or attachment means can be used for securing floor sub-assembly 30 within housing assembly 12, and floor sub-assembly 30 may be removably or permanently attached to housing assembly 12. Floor sub-assembly 30 includes floor panel 32 and lower guide elements 34 that extend from floor panel 32 into the interior of connector housing 10. In the illustrated embodiment, lower guide elements 34 comprise substantially cylindrical pins although, as will be understood from this disclosure, lower guide elements 34 can have other shapes and sizes than those illustrated. In one embodiment, lower guide elements 34 may extend from bottom panel 13. The purpose and function of floor sub-assembly 30, floor panel 32, and lower guide elements 34 will be described in fuller detail below.

As also seen in FIG. 3, embodiments of the connector housing 10 may also or alternately include a ceiling sub-assembly 40. Ceiling sub-assembly 40 is removably attached to housing assembly 12 adjacent top panel 20. Any suitable fasteners or attachment means can be used for securing ceiling sub-assembly 40 within housing assembly 12. Ceiling sub-assembly 40 includes ceiling panel 42, front face 44, rear face 46, and upper guide elements 48 (FIG. 2B) that extend from ceiling sub-assembly 40 into the interior of connector housing 10. In the illustrated embodiment, upper guide elements 48 comprise substantially cylindrical pins although, as will be understood from this disclosure, upper guide elements 48 can have other shapes and sizes than those illustrated. As will be described in further detail below, ceiling panel 42, floor panel 32, upper guide elements 48 and lower guide elements 34 define a plurality of berths 50 (FIG. 2B) for receiving adapter units 80 (FIGS. 2A and 2B) therein, and are configured and positioned to guide and grossly or roughly align adapter units 80 as they are inserted into the berths 50.

Front face 44 of ceiling sub-assembly 40 supports a backplane printed circuit board (PCB) 52. Backplane PCB 52 includes a plurality of forward facing electrical connectors 54 on its front face, and a lesser number of rearward facing cable connectors 56 (FIGS. 8-10) on its back face. In one embodiment, backplane PCB 52 includes a forward facing electrical connector 54 for each berth 50. Backplane PCB 52 consolidates the signals from two or more of the forward facing electrical connectors 54 into a single rearward facing cable connector 56. In one embodiment, backplane PCB 52 consolidates the signals from two forward facing electrical connectors 54 into a single rearward facing cable connector 56. In one embodiment, forward facing electrical connectors 54 are 12-pin connectors, and rearward facing cable connectors 56 are 24-pin connectors, although connectors with different numbers of pins may also be used, provided signals from two or more of the forward facing electrical connectors 54 are consolidated into a single rearward facing cable connector 56. For example, a 25-pin connector could be used to consolidate two 12-pin connectors, with the extra pin location grounded to the housing assembly 12.

An electrically conductive cable 58 runs from each of the rearward facing cable connectors 56 on backplane PCB 52 to rear face 46 of ceiling sub-assembly 40, where each cable 58 is terminated by another cable connector 60 adjacent rear panel 18. Cables 58 may comprise any suitable type of multi-conductor cable, such as ribbon cables, bundled cables or other grouped cables. As schematically illustrated in FIG. 8, cable connectors 60 are configured for connection to a signal processor/analyzer 62 (such as by cable 64) that determines port level connectivity as described in further detail below. In one embodiment, connectors 60 are positioned substantially even with or extend beyond rear panel 18. In another embodiment, connectors 60 are positioned within the interior of housing assembly 12.

It will be appreciated that, when ceiling sub-assembly 40 is installed in housing assembly 12, cables 58 are hidden and protected from tampering or damage between ceiling panel 42 of ceiling sub-assembly 40 and top panel 20 of housing assembly 12 (FIGS. 3 and 8). However, in one embodiment, ceiling panel 42, front face 44, and rear face 46 of ceiling sub-assembly 40 may be eliminated, such that backplane PCB 52 with connectors 54, 56 thereon is supported by other means (e.g., a mounting bracket secured to top panel 20), and connectors 60 are supported by other means (e.g., a mounting bracket secured to top panel 20) adjacent rear panel 18 of housing assembly 12.

It will also be appreciated that in another embodiment according to the invention, the housing assembly 12 may be configured such that the positions of sub-assemblies 30, 40 are reversed from those described above. That is, in another embodiment, sub-assembly 40 (supporting backplane PCB 52, electrical connectors 54, 60, and cables 58) may be positioned adjacent bottom panel 13, and sub-assembly 30 may be positioned adjacent top panel 20.

It will further be appreciated that, in one embodiment, sub-assembly 30 and sub-assembly 40 may be used to retrofit a connector housing, and thus may be sold as a retro-fit kit, separate from a connector housing.

Connector housing 10 has several additional advantageous features making it adaptable for different applications by changing configurations. For instance, top panel 20 includes a stationary portion 20a and a jumper management panel 20b that is rotatable relative to stationary portion 20a. Jumper management panel 20b includes cable routing guides 21 attached thereon. However, jumper management panel 20b may have other configurations. In the illustrated embodiment, jumper management panel 20b is securable in either a generally vertical position or a generally horizontal position (as indicated by arrow 22 in FIG. 2A) for organizing and routing cables to the front of connector housing 10. Of course, other configurations are possible for holding the jumper management panel in the vertical position. In the generally vertical position, jumper management panel 20b extends above stationary portion 20a of top panel 20. When jumper management panel 20b is secured in the generally horizontal position it is generally flush with stationary portion 20a. Moreover, jumper management panel 20b can be designed so that it is removable from connector housing 12.

Connector housing 10 may advantageously include at least one cable entry plate assembly 70, thereby allowing adaptability for different cable entry configurations at the sides of connector housing 10. FIGS. 1, 2A, 3 and 4A depict connector assembly 10 having cable entry plate assemblies 70 attached to first and second side panels 14, 15. Cable entry plate housing 70 includes a plate 72 having features such as grommet 74, thereby inhibiting the cable from chaffing against an edge. In the illustrated embodiment, cable entry plate assembly 70 includes two grommets 74 so that multiple cables may enter a single side of connector housing 10. In other embodiments, cable entry plate assembly 70 does not have grommets, but instead is merely a removable cable entry plate 72. Moreover, cables may enter the connector housing 10 from the top, the bottom, or both.

Figure 4A:
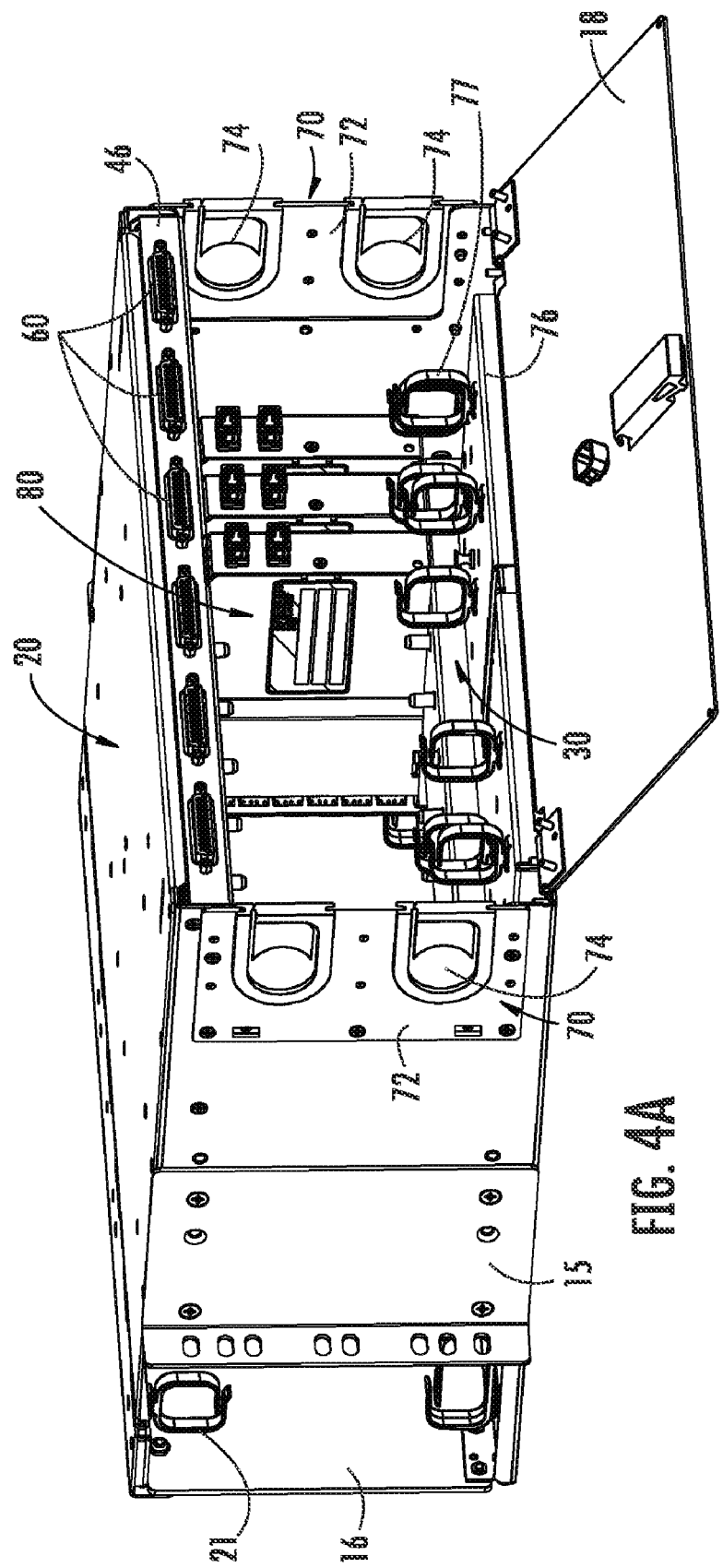
FIG. 4A is a rear perspective view of the connector housing of FIG. 1 having the rear panel in an open position.
Figure 4B:
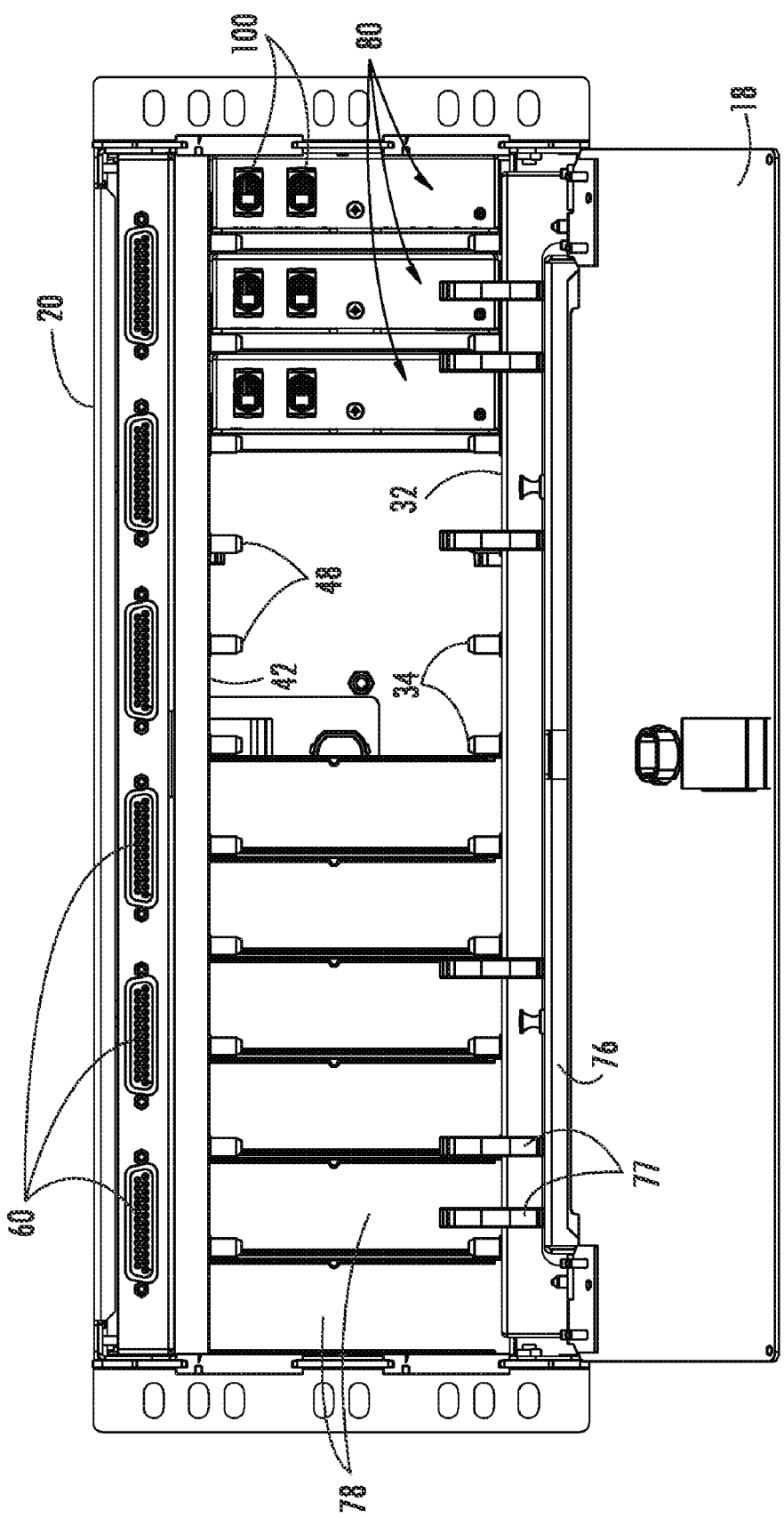
FIG. 4B is a rear view of the connector housing of FIG. 1 having the rear panel in an open position.

Embodiments of the connector housing 10 according to the present invention may also include one or more fiber management shelves 76 as best shown in FIGS. 3-4B. Fiber management shelves 76 are removably attached to housing assembly 12 and allow for routing and organization of cables/optical waveguides that enter connector housing 12 from the sides at the rear. Any suitable fasteners or attachment means can be used for securing fiber management shelves 76 to housing assembly 12. Moreover, fiber management shelves 76 can be attached to other panels of housing assembly 12. Fiber management shelf 76 also includes a plurality of cable routing guides 77 and a plurality of apertures (not numbered) for attaching cable ties, thereby allowing for organization and grouping of cables/optical waveguides.

FIGS. 1-4B depict the connector housing 10 having blank panels 78 at some berth locations, a plurality of adapter units 80 substituted for blank panels 78 at other berth locations, and some berth locations are empty. Adapter units 80 and blank panels 78 are attached to housing assembly 12 using fasteners, preferably, fasteners that do not require tools and are quick and easy for the craftsman to install and remove. In this case, adapter units 80 use push pin fasteners 81 (FIG. 5A) near the top and bottom edges that engage corresponding holes adjacent the top and bottom panels 20, 13, respectively, of housing assembly 12, thereby allowing the craftsman to quickly and easily remove the same.

Referring now to FIGS. 5A-6B, in one embodiment, an adapter unit 80 includes a plurality of adapters 82 supported by a housing or chassis 84. Chassis 84 may be formed of any suitable material, such a sheet metal, plastic, or the like. Adapters 82 are used for connecting and making optical connections between the cables/optical waveguides at the front of connector housing 10 and the cables/optical waveguides at the rear of connector housing 10. In the illustrated embodiment, adapters 82 comprise twelve LC duplex adapters, but the number of adapters 82 may be varied more or less from that shown, and other types of adapters 82 may be selected to work with connectors of a particular of communication network system. For example, other possible adapter types include, without limitation, LC adapters, SC adapters, FC adapters, ST adapters, SC duplex adapters, FC duplex adapters, ST duplex adapters, FDDI adapters, and MT adapters, to name a few. In one embodiment, adapter units 80 installed in connector housing 10 may have multiple types of adapters 82.

Chassis 84 also supports an adapter unit PCB 86 which forms the front face of the adapter unit 80 and through which the adapters 82 protrude. On the front face of adapter unit PCB 86 there is an electrical contact pad 88 for each adapter 82 where the pogo pin 116 (FIG. 7) of a mating patch cable 110 (FIG. 7) lands when the patch cable 110 is plugged into the adapter 82. The contact pads 88 are part of or attached to adapter unit PCB 86 and have individual circuit traces leading to a unique pin position of an adapter unit electrical connector 90 on the back side of adapter unit PCB 86. Adapter unit electrical connector 90 is configured to mate with forward facing electrical connector 54 on backplane PCB 52 as the adapter unit 80 is inserted into a berth 50 in connector housing 10, as described in further detail below.

In one embodiment, each contact pad 88 has a corresponding electrical contact test pad 92 positioned at a location that is easy to reach by a test probe when patch cables are plugged into adapters 82. Test pads 92 are part of adapter unit PCB 86 and have individual circuit traces leading to the same pin position of adapter unit electrical connector 90 as the corresponding contact pad 88. In one embodiment, test pads 92 are located at a periphery of the face of adapter unit PCB 86. In one embodiment, the front surface of adapter unit PCB 86 is optionally covered by a protective overlay 94 that reveals contact pads 88 and test pads 92, and that optionally provides locations to note information regarding the adapter unit.

Figure 5B:
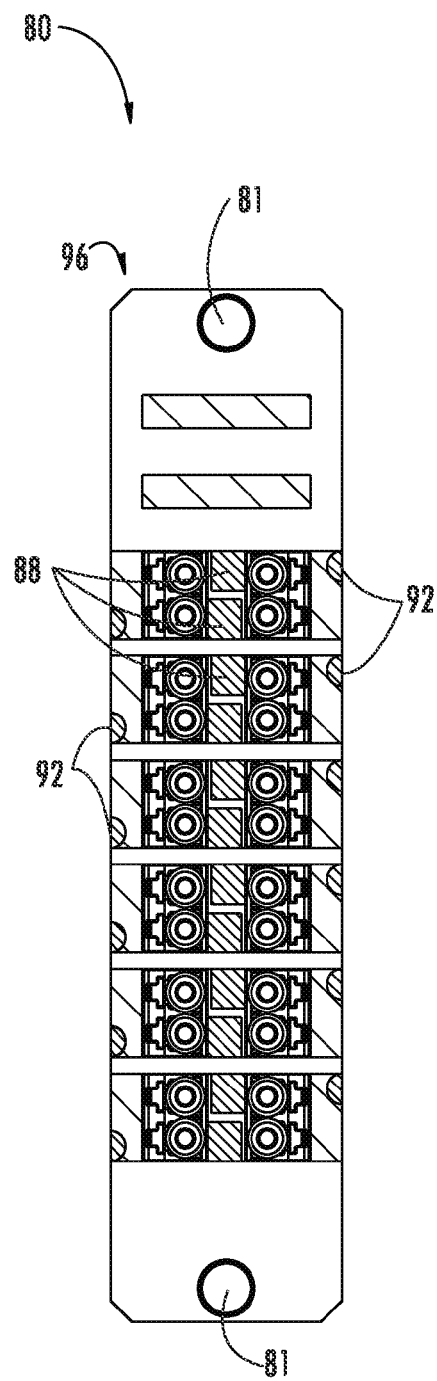
FIG. 5B is a front view of the adapter panel of FIG. 5A.
Figure 5A:
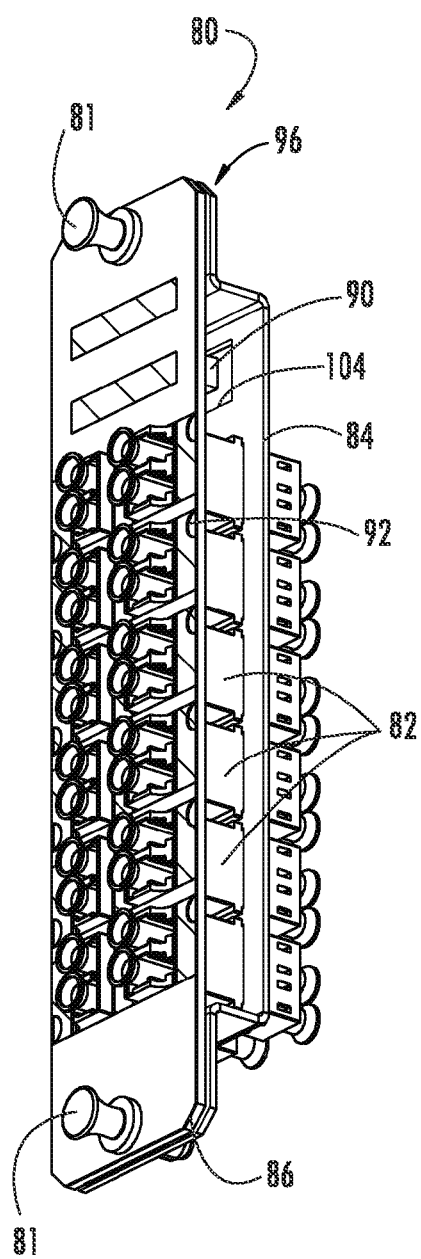
FIG. 5A is a front perspective view of one embodiment of an adapter panel according to the invention.
Figure 5C:
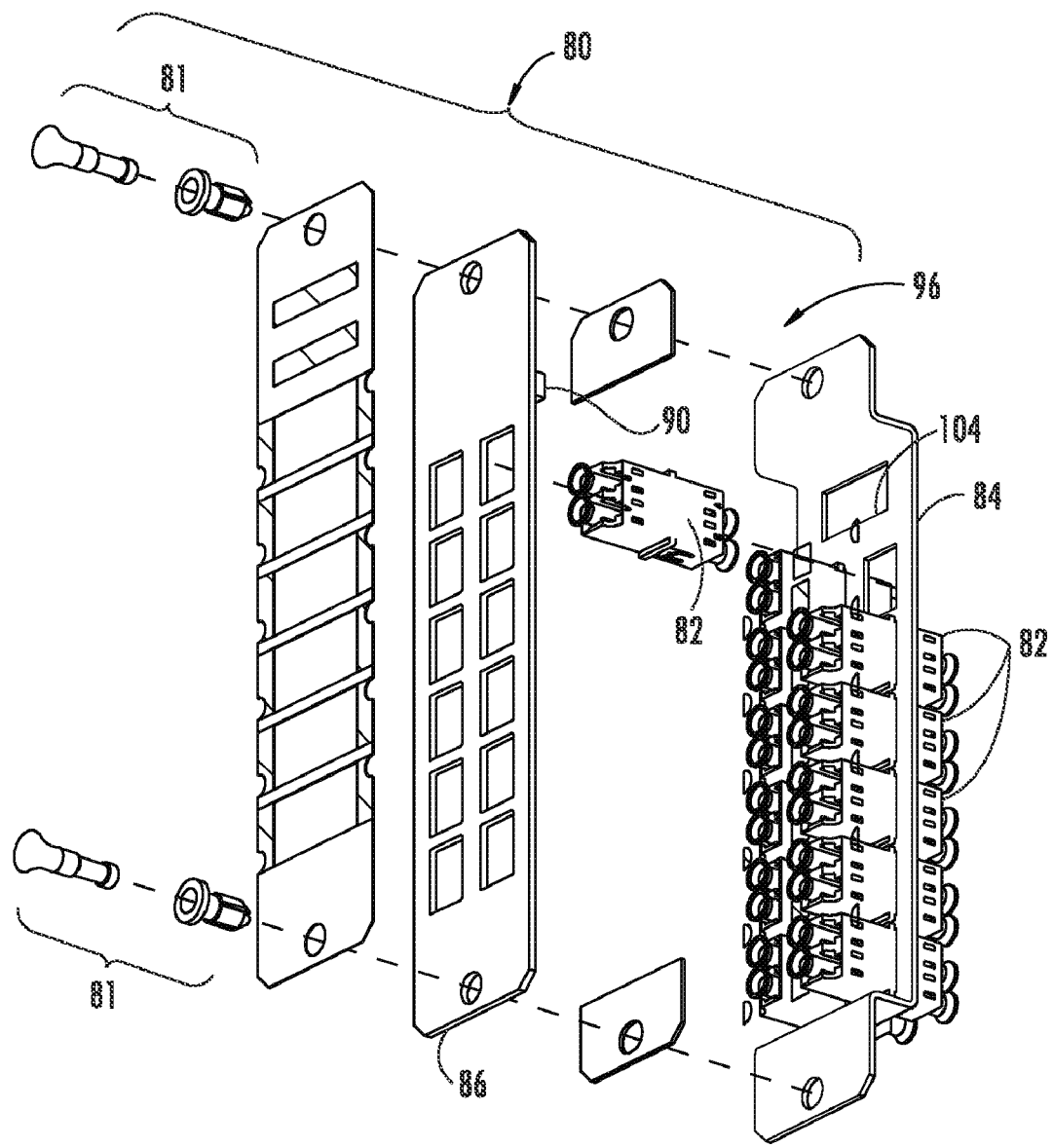
FIG. 5C is an exploded front perspective view of the adapter panel of FIG. 5A.

As illustrated in FIGS. 5A-5C, in one embodiment adapter unit 80 is configured as an adapter panel 96, also referred to as a "patch panel" or "panel". As illustrated in FIGS. 6A-6B, in one embodiment adapter unit 80 is configured as an adapter module 98, also referred to as a "module". Adapter modules 98 are similar to adapter panels 96, but differ in that the plurality of adapters 82 at the front thereof are consolidated into a lesser number of adapters 100 at the rear thereof. Communication lines from the plurality of adapters 82 are consolidated into a smaller number of adapters 100 by a wiring harness 120 within the module body 102 (FIG. 8), thereby requiring fewer connections to be made and tracked at the rear of connector housing 10 and allowing the craftsman to quickly make such connections. In the illustrated embodiment, each adapter module 98 has twelve LC duplex adapters on the front and two 12 fiber MTP adapters at the rear. A fiber harness inside the module body 102 connects the LC duplex adapters to the MTP adapters, consolidating the 12 pairs of LC duplex adapters into two 12-fiber MTP adapters. Of course, the number of adapters 82, 100 may be varied more or less from that shown and other types of adapters 82, 100 may be selected to work with connectors of a particular of communication network system.

In use, connector housing 10 may house any combination of adapter units 80, including only adapter panels 96, only adapter modules 98, or a combination of panels 96 and modules 98, depending upon the needs and requirements of the communication network operator. Adapter units 80 may be incrementally added to or removed from connector housing 10 as the needs and requirements of the communication network change over time, thereby providing the system with the distinct advantage of modular scalability that allows optimum use and minimizes costs, combined with the ability to determine port level connectivity of each adapter unit independently, regardless of the number of adapter units included in the network. Cabling complexity is reduced by eliminating the need for independent network cables for each individual patch panel, and the volume of network-related cables is significantly reduced.

As described above, in addition to defining berths 50 within connector housing 10, ceiling panel 42, floor panel 32, upper guide elements 48 and lower guide elements 34 are configured and positioned to guide and roughly align adapter units 80 as they are inserted into berths 50. More specifically, when adapter unit 80 is a module 98, the upper and lower guide surfaces (i.e., panels 42 and 32) engage module body 102 to roughly align the module 98 vertically, and the guide elements 34, 38 roughly align the module 98 from side to side. These rough alignment features ensure that module 98 is in the general up-and-down and left-to-right vicinity of where it needs to be for the PCB electrical connectors 90, 54 on module 98 and backplane 52, respectively, to mate. In one embodiment, fine alignment of adapter unit 80 (both panels 96 and modules 98) is accomplished by the alignment of push pin fasteners 81 with corresponding holes adjacent the top and bottom panels 20, 13, respectively, of housing assembly 12. When adapter unit 80 is a panel 96, only the fine alignment features are used because of the shallow depth of the panel 96.

Referring again to FIGS. 5A-6B, in one embodiment, fine alignment of adapter unit 80 (both panels 96 and modules 98) is also or alternately provided by cooperation between clearance cutout 104 in the chassis 84 of the adapter unit 80 and forward facing electrical connector 54 on backplane PCB 52. Cutout 104 is aligned with adapter unit electrical connector 90 on the back side of adapter unit PCB 86, and has a size and shape selected to closely conform to the exterior dimensions of forward facing electrical connector 54 on backplane PCB 52. As adapter unit 80 is inserted into a berth 50 in connector housing 10, the complementary shapes of cutout 104 and electrical connector 54 cooperate to closely or finely align adapter unit electrical connector 90 with electrical connector 54 and thereby allow blind mating of electrical connectors 90, 54 during insertion of adapter unit 80. Cutout 104 also prevents electrical connector 90 from being damaged, should the rough alignment features not align the adapter unit 80 sufficiently. Beneficially, the rough alignment provided by the cooperation of ceiling panel 42, floor panel 32, upper guide elements 48 and lower guide elements 34 positions the adapter unit 80 such that easy transition to the fine alignment provided by pins 81 and the interaction of cutout 104 and electrical connector 54 is easily achieved.

Referring to FIG. 7, one embodiment of a patch cable 110 used with the system is illustrated. Patch cable 110 includes a cable 112 having network communication lines (i.e., optical fibers) that support network data communication (i.e., "in-band" communication) and an additional out-of-band electrical conductor that supports the out-of-band signal connections for determining port level connectivity. Cable 112 is terminated on both ends by a connector 114 supporting both optical and electrical connections of cable 112. In one embodiment, cable 112 includes one or more optical fibers and at least one electrically conductive wire, and connector 114 includes an optical connector 115 and an electrical connector 116. In one embodiment, optical connector 115 is an LC duplex connector terminating the optical fibers of cable 112, and electrical connector 116 is a pogo pin terminating the conductive wire of cable 112, although any suitable combination of fiber and electrical connectors could be used. In one embodiment, electrical connector 116 is configured to articulate or move back and forth to remain engaged with contact pad 88 if connector 114 is disturbed while still engaged with adapter 82.

Referring now to FIG. 8, the installation of an adapter unit 80 (e.g., an adapter module 98) into connector housing 10 is illustrated. An exemplary patch cable 110 having both optical and electrical communication lines is plugged into one of the adapters 82 of module 98. Within body 102 of module 98, optical fiber harness 120 consolidates optical fibers 122 from the plurality of adapters 82 into the smaller number of adapters 100 at the back side of module body 102 (e.g., consolidating 12 pairs of LC duplex adapters 82 into two 12-fiber MTP adapters 100). Multi-fiber optical cables 124 connected to adapters 100 are routed to other parts of the communication network. The electrical communication line of patch cable 110 makes contact with the corresponding contact pad 88 using an appropriate electrical contact, e.g., pogo pin 116. The contact pads 88 on adapter unit PCB 86 are consolidated into a single electrical connector 90 on the opposite (i.e., back) side of PCB 86 (e.g., 12 contact pads 88 are consolidated to a 12-pin electrical connector 90 on the back side of adapter unit PCB 86). Adapter unit electrical connector 90 in turn mates with forward facing connector 54 on backplane PCB 52. Backplane PCB 52 consolidates the electrical signals from two or more forward facing connectors 54 (FIGS. 2B, 3, 9) into a rearward facing connector 56 on the back side of backplane PCB 52. Electrical cable 58 runs from the back side of backplane PCB 52 to the rear of connector housing 10. Finally, an electrical cable 64 runs from connector 60 at the back of connector housing 10 to an analyzer 62. In summary, the electrical continuity path is from analyzer 62 to connector housing 10 via cable 64, through connector housing 10 via cable 58 to a contact pad 88 of an individual port (i.e., adapter 82) on an adapter unit 80 (e.g., a patch panel 96 or a module 98), through the adapter unit 80 to a patch cable 110, through the patch cable 110 to a different port on the same or different adapter unit 80, and then back to the same or different analyzer 62 via a reciprocal path. A single analyzer 62 may be connected to a plurality of connectors 60 at the back of connector housing 10, thereby allowing modular scalability of the system.

Figure 9:
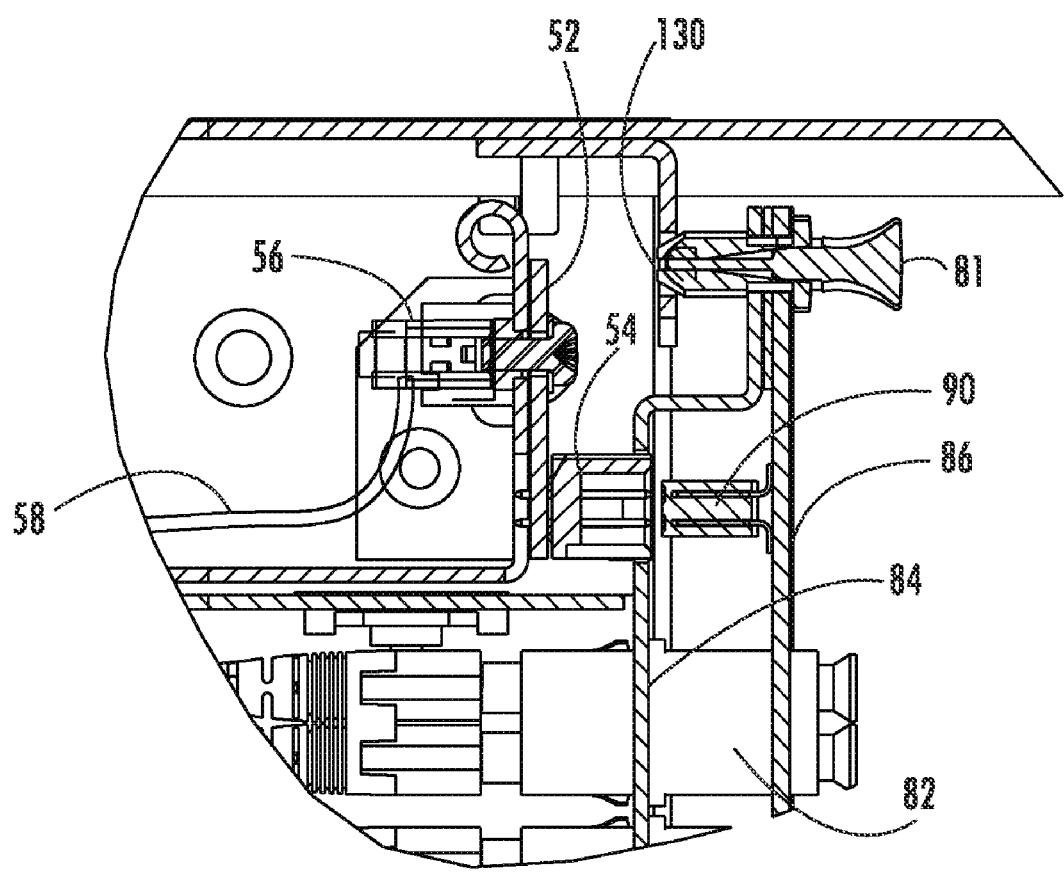
FIG. 9 is an enlarged view of circled portion "A" of FIG. 8, showing the interface between an adapter unit and the connector housing.

Referring now to FIG. 9, a more detailed illustration is provided of the interface between an adapter unit 80 and the connector housing 10. FIG. 9 illustrates a module 98 roughly aligned within connector housing 10 and positioned for final blind mating between electrical connectors 90, 54 of adapter unit PCB 86 and backplane PCB 52, respectively. Fine alignment of electrical connectors 90, 54 is provided by the alignment of push pin fasteners 81 with corresponding holes 130 of housing assembly 12. Fine alignment of electrical connectors 90, 54 is also or alternately provided by cooperation between clearance cutout 104 in the chassis 84 of the adapter unit 80 and forward facing electrical connector 54 on backplane PCB 52. Cutout 104 forces alignment between rearward facing electrical connector 90 on adapter unit PCB 86 with forward facing electrical connector 54 on backplane PCB 52, because cutout 104 has a size and shape selected to closely conform to the exterior dimensions of connector 54. As adapter unit 80 is inserted into a berth 50 in connector housing 10, the complementary shapes of cutout 104 and electrical connector 54 cooperate to closely or finely align adapter unit electrical connector 90 with electrical connector 54. The fine alignment features thereby allow blind mating of electrical connectors 90, 54 during insertion of adapter unit 80. As noted above, when adapter unit 80 is a panel 96, only the fine alignment features are used because the shallow depth of panel 96 is insufficient to make use of the rough alignment provided by the cooperation of ceiling panel 42, floor panel 32, upper guide elements 48 and lower guide elements 34.

Figure 10:
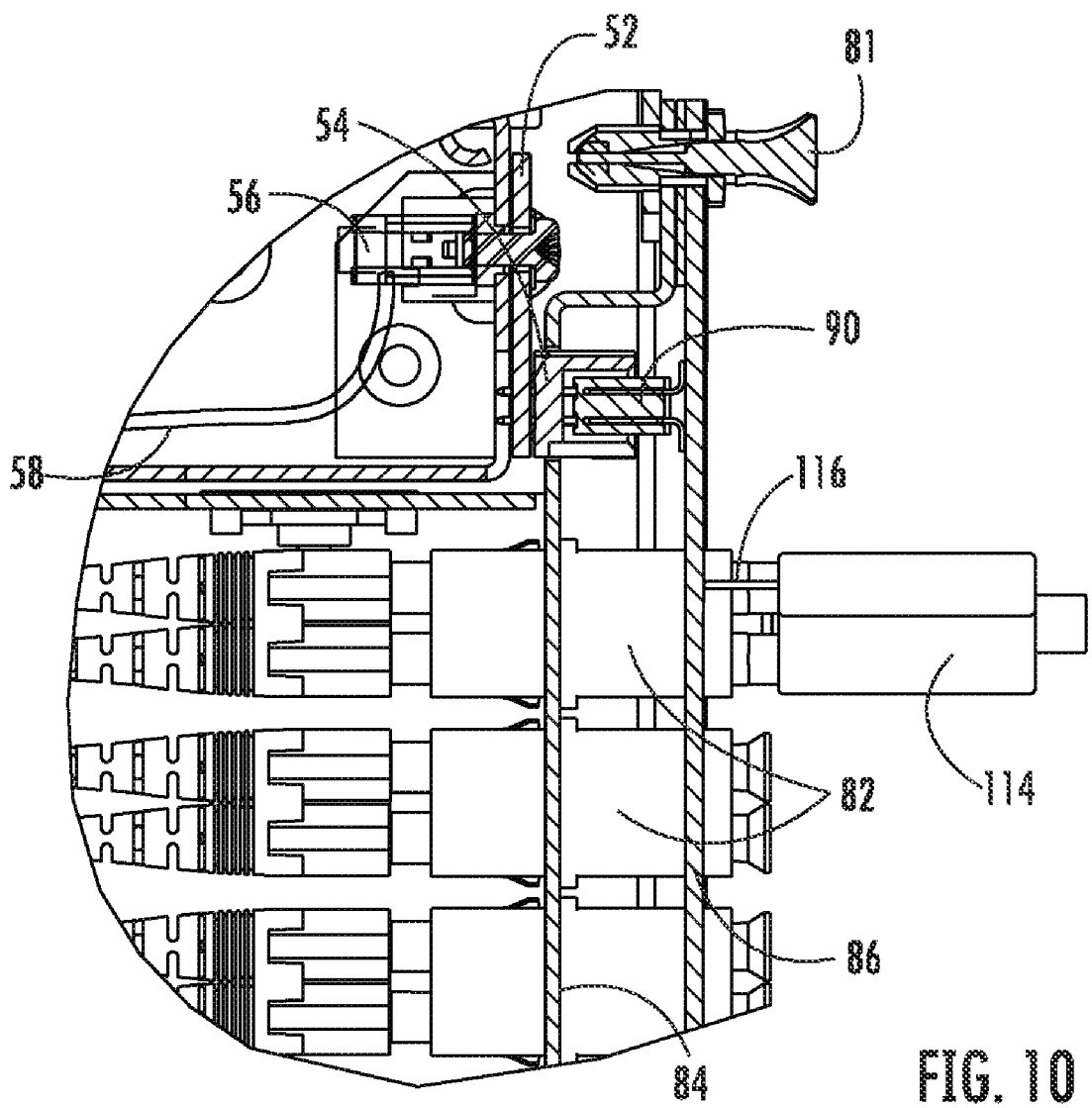
FIG. 10 is an enlarged view of circled portion "A" of FIG. 8, showing the interface between an adapter unit and a patch cable.

Referring now to FIG. 10, a more detailed illustration is provided of the interface between an adapter unit 80 and a patch cable 110. FIG. 10 illustrates connector 114 of patch cable 110 during initial insertion into an adapter 82, but before pogo pin 116 has made contact with contact pad 88 on adapter unit PCB 86. As patch cable 110 is fully inserted into adapter 82, pogo pin engages contact pad 88, as seen in FIG. 8.

In the embodiments of FIGS. 1-10, exemplary connector housing 10 is illustrated as a size 4 U housing. However, connector housings according to the invention are not limited to any particular size or shape. As will be appreciated from this disclosure, adapter units 80 (e.g., panels 96 and modules 98) as previously described may be used in, for example, a 1 U-sized housing of FIGS. 11-13.

Figure 11:
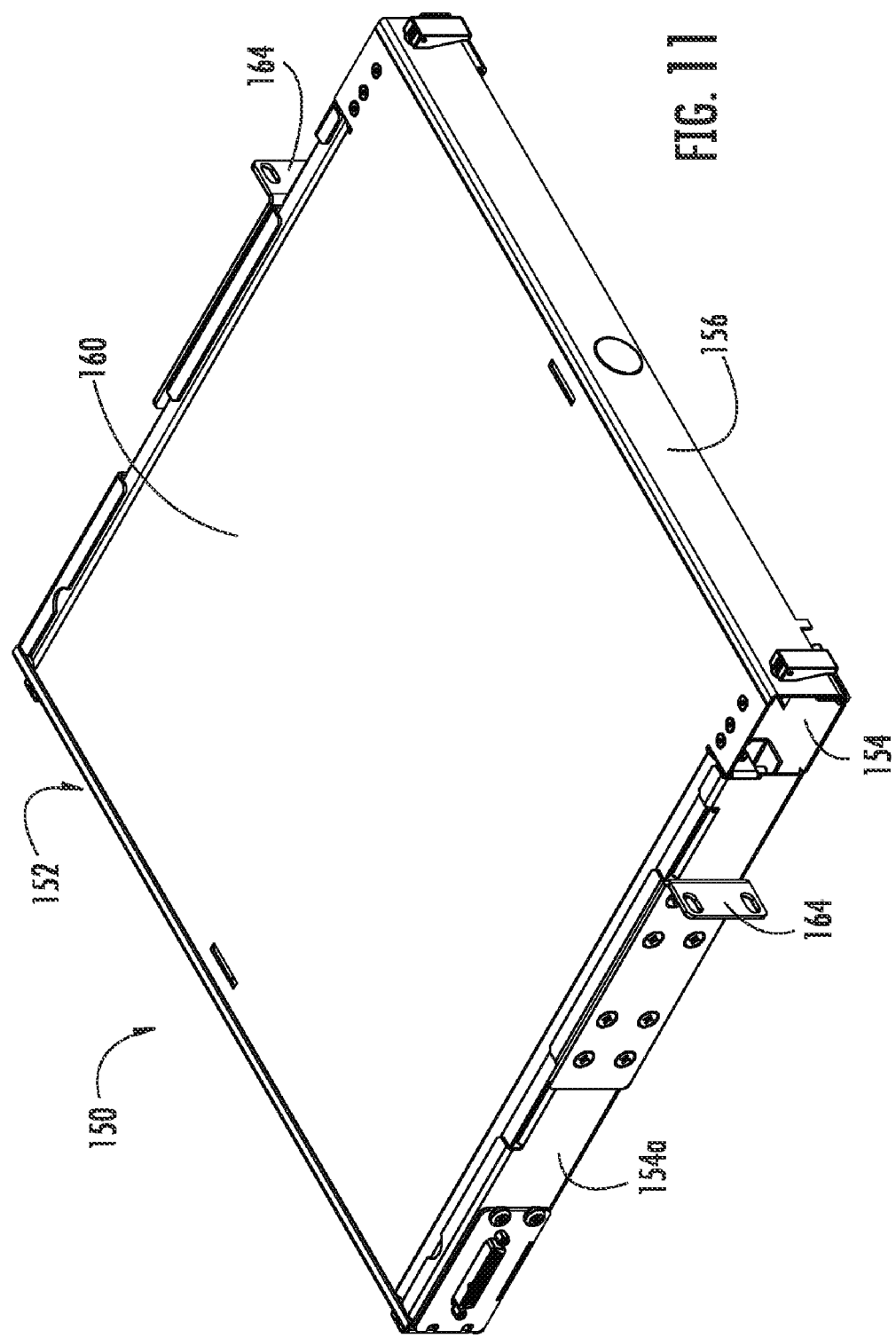
FIG. 11 is a front perspective view of another embodiment of a connector housing according to the present invention.
Figure 12:
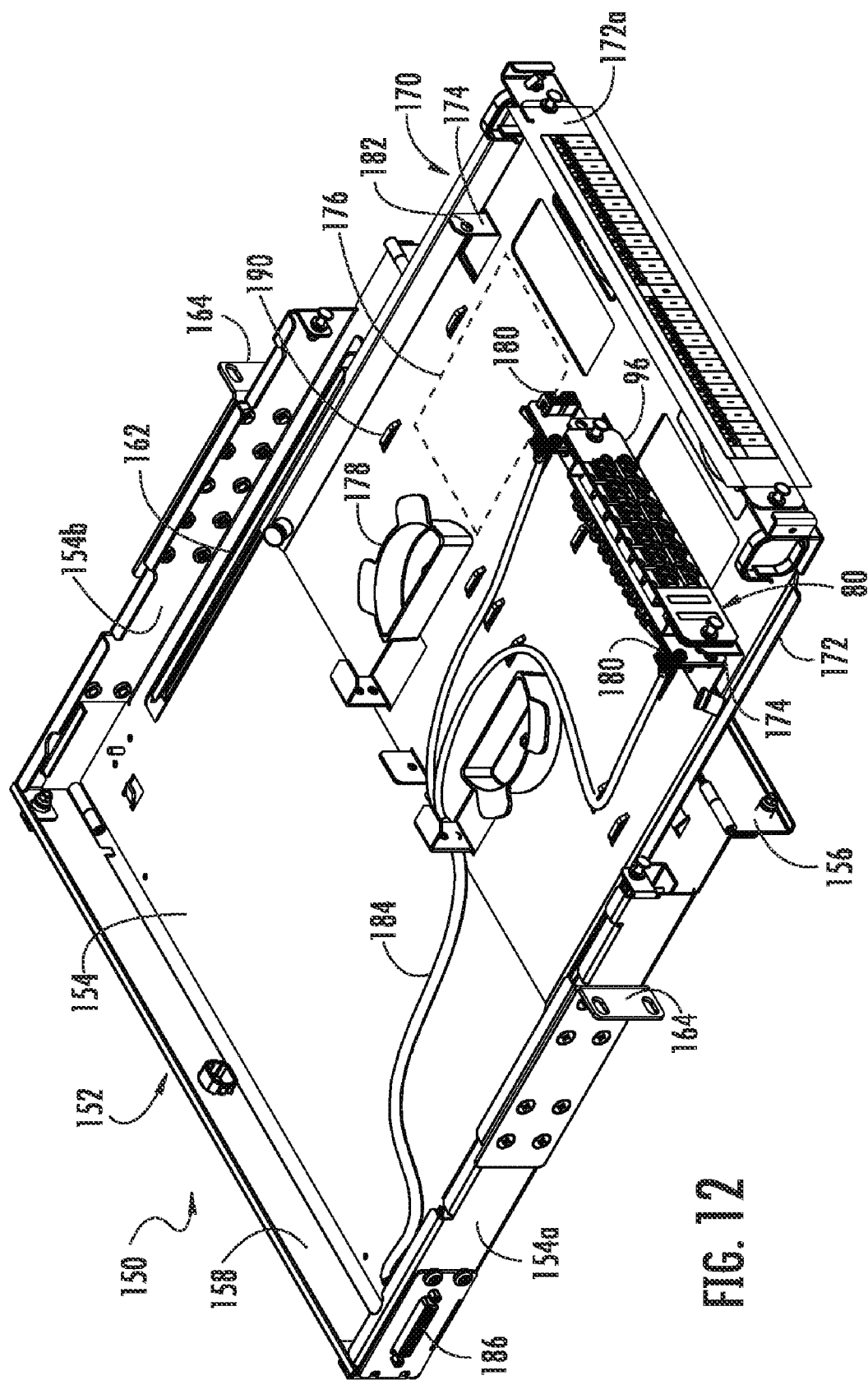
FIG. 12 is a front perspective view of the connector housing of FIG. 11 having the top of the housing removed and tray pulled forward, with an adapter panel installed in the housing.
Figure 13:
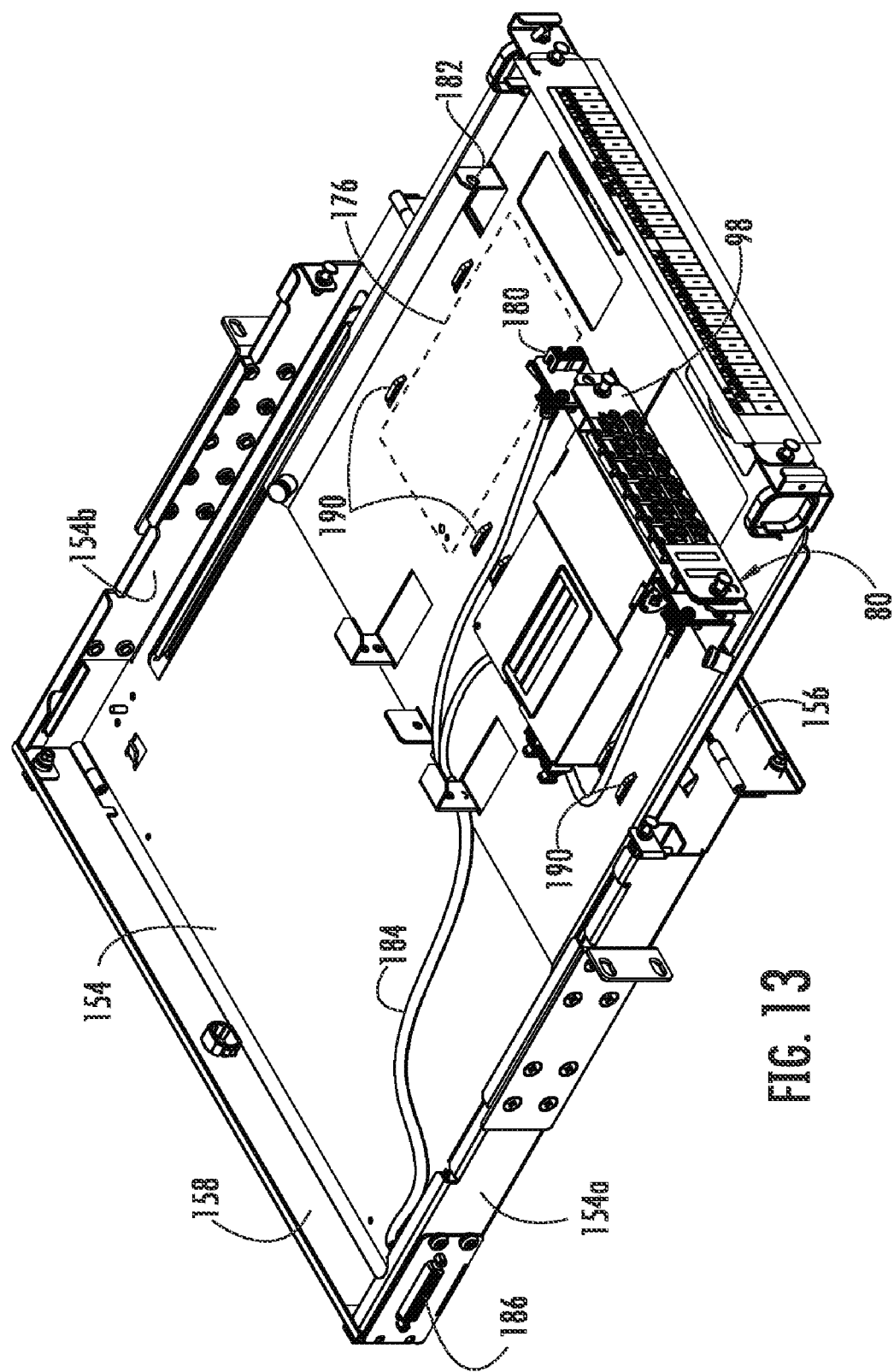
FIG. 13 is a front perspective view like that of FIG. 11, but having an adapter module installed in the housing.

Illustrated in FIGS. 11-13 is another embodiment of an exemplary connector housing 150 according to the invention. As with connector housing 10 described above, connector housing 150 is typically mounted to an equipment rack (not shown) and used for organizing, routing, and storing optical connections and cables of a communication network. Connector housing 150 includes a housing assembly 152 and a tray assembly 170 being slidably mounted to housing assembly 152 so that the craftsman can access optical components, cables, and/or hardware attached to and/or disposed on tray assembly 170.

Housing assembly 152 includes a bottom panel 154 having integrally formed sides 154*a*, 154*b*, a front panel 156, a rear panel 158, a top panel 160, a pair of tray slides 162, and a pair of rack mounts 164. Front panel 156 and rear panel 168 are rotatable from latched closed positions (FIG. 11) to open positions (FIGS. 12 and 13), thereby allowing the craftsman access to the interior space respectively from both the front and the rear. The panels and sides of housing assembly 152 generally define an interior space of connector housing 150. Of course, other configurations of the connector housing 150 are possible and intended.

Tray assembly 170 includes a sliding tray 172 having brackets 174 integrated with or secured thereto. Brackets 174 define berths 176 for receiving one or more adapter units 80, as will be described in further detail below. Tray 172 may also include slack cable storage devices 178. In one embodiment, a front portion 172a of tray 172 is removable, thereby allowing improved access to berths 176 for the craftsman. Of course, other configurations of the tray assembly 170 are possible.

Brackets 174 support forward facing electrical connectors 180 (configured to engage electrical connector 90 on adapter unit PCB 86) and have holes 182 therein for engaging push-pin fasteners 81 of adapter units 80, as described above. A forward facing electrical connector 180 is provided for each berth 176. Signals from the forward facing electrical connectors 180 are carried by electrically conductive cables 184 from each of the forward facing connectors 180 to cable connector 186 adjacent the back of connector housing 150. In one embodiment, cable connector 186 is mounted in one of side panels 154a, 154b adjacent rear panel 158. In another embodiment, cable connector 186 is mounted on rear panel 158. Cable connector 186 is configured for connection to a signal processor/analyzer 62 that determines port level connectivity of adapter units 80 installed in connector housing 150. In one embodiment, forward facing electrical connectors 180 are 12-pin connectors, and cable connector 186 is a 25-pin connector with the $25^{th}$ pin grounded to connector housing 150. Of course, connectors with different numbers of pins may also be used, provided signals from the forward facing electrical connectors 180 are consolidated into a smaller number of cable connectors 186 adjacent the back side of connector housing 150.

In one embodiment, tray 172 may provide guide elements 190 to aid in roughly aligning and positioning adapter units 80 as they are inserted into berths 176 of connector housing 150. In the illustrated embodiment, guide elements 190 comprise lances extending from tray 172 although, as will be understood from this disclosure, guide elements 190 can have shapes and sizes other than those illustrated.

Fine alignment of electrical connectors 90, 180 is provided by the alignment of push pin fasteners 81 with corresponding holes 182 in brackets 174, and also or alternately by cooperation between clearance cutout 104 in the chassis 84 of the adapter unit 80 and forward facing electrical connector 180 on bracket 174. Cutout 104 forces alignment between electrical connector 90 on adapter unit PCB 86 with connector 180 because cutout 104 has a size and shape selected to closely conform to the exterior dimensions of connector 180. As adapter unit 80 is inserted into a berth 176 in connector housing 150, the complementary shapes of cutout 104 and electrical connector 180 cooperate to closely or finely align adapter unit electrical connector 90 with electrical connector 180. The fine alignment features thereby allow blind mating of electrical connectors 90 and 180 during insertion of adapter unit 80. As noted above, when adapter unit 80 is a panel 96, only the fine alignment features are used because the shallow depth of panel 96 is insufficient to make use of the rough alignment provided by guide elements 190.

For purposes of clarity, FIGS. 12 and 13 depict connector housing 150 having only a single adapter unit 80 installed, although connector housing 150 is configured to receive two adapter units 80. Specifically, FIG. 12 illustrates an adapter panel 96, and FIG. 13 illustrates an adapter module 98. In use, connector housing 150 may house only adapter panels 96, only adapter modules 98, or a combination of panels 96 and modules 98, depending upon the needs and requirements of the communication network operator.

It will be appreciated that, in one embodiment, tray assembly 170 may be used to retrofit a connector housing, and thus may be sold as a retro-fit kit, separate from a connector housing. In one embodiment, tray assembly 170 including tray 172, brackets 174, connectors 180, 186, cable 184 and associated installation hardware may be sold as a retro-fit kit.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents. For example, the connector housing can have other configurations such as a larger or smaller height, or different width thereby occupying a different amount rack space. Similarly, the types and locations of connectors can be altered from those shown and described. Therefore, it is to be understood that the invention is not to be limited to the specific embodiments disclosed and that modifications and other embodiments may be made within the scope of the appended claims. Although specific terms are employed herein, they are used in a generic and descriptive sense only and not for purposes of limitation. The invention has been described with reference to an optical connector housing, but the inventive concepts of the present invention are applicable to other suitable communication networks as well.

What is claimed is:

1. A connector housing for a communications network comprising:
    a housing assembly having an interior defined by a first side panel, a second side panel, a bottom panel, and a top panel, the interior having a plurality of berths therein,
    an adapter unit inserted from a front of the housing assembly and positioned in one of the berths, the adapter unit comprising:
        a plurality of adapters for making optical connections with optical waveguides;
        an adapter unit electrical connector; and
        an adapter chassis having a cutout spaced apart from and aligned with the adapter unit electrical connector;
    a housing electrical connector associated with each berth, each housing electrical connector facing the front of the housing assembly for passing through the cutout of the adapter chassis and then engaging the adapter unit electrical connector as the adapter unit is inserted into the berth, wherein the size and shape of the cutout closely conform to the exterior dimensions of the housing electrical connector, whereby the cutout facilitates alignment between the adapter unit electrical connector and the housing electrical connector;
    guide elements for guiding and aligning the housing electrical connectors with the respective adapter unit connectors as the adapter units are inserted into the berth, the guide elements allowing blind mating of the housing electrical connectors and the adapter unit connectors; and
    at least one cable connector positioned adjacent a back of the housing assembly, the cable connector in electrical communication with and consolidating electrical contacts from at least two housing electrical connectors.

2. The connector housing of claim 1, further comprising a tray slidably mounted to the housing assembly, wherein the housing electrical connectors and guide elements are supported on the tray.

3. The connector housing of claim 2, wherein the housing assembly has a 1 U size.

4. The connector housing of claim 1, wherein the housing assembly has a 4 U size.

5. The connector housing of claim 1, further comprising a first sub-assembly positioned within the housing assembly adjacent one of the top panel and the bottom panel, the first sub-assembly defining a first guide surface and supporting the housing electrical connectors facing the front of the housing assembly, and further supporting the cable connectors positioned adjacent the back of the housing assembly, wherein cables extending between the connectors are concealed by the first guide surface.

6. The connector housing of claim 5, wherein the first sub-assembly further includes a plurality of first guide elements protruding from the first guide surface.

7. The connector housing of claim 6, further comprising a second sub-assembly positioned within the housing assembly opposite the first sub-assembly, the second sub-assembly defining a second guide surface and having a plurality of second guide elements protruding therefrom; wherein the first guide surface, second guide surface, first guide elements and second guide elements define the plurality of berths and are configured to guide and roughly align adapter units as they are inserted into the berths.

8. The connector housing of claim 1, wherein the housing electrical connectors are positioned on a first side of a backplane printed circuit board, and wherein the backplane printed circuit board consolidates signals from two or more housing electrical connectors into a single rearward facing cable connector.

9. The connector housing of claim 7, wherein the first sub-assembly is positioned adjacent the top panel and the second sub-assembly is positioned adjacent the bottom panel such that the first guide surface defines a ceiling and the second guide surface defines a floor, and wherein cables extending between the connectors are concealed between the ceiling and the top panel.

10. A communication network management system comprising:
the connector housing of claim 1; and
wherein the adapter unit electrical connector is in electrical communication with a plurality of contact pads on the front side of the adapter unit, each of the plurality of contact pads associated with a corresponding one of the plurality of adapters.

11. The system of claim 10, wherein the adapters comprise an LC duplex adapter, LC adapter, SC adapter, FC adapter, ST adapter, FC duplex adapter, ST duplex adapter, SC duplex adapter, FDDI adapter, and MT adapter.

12. The system of claim 10, wherein the adapter units comprise one of an adapter module and an adapter panel.

13. The system of claim 10, wherein the adapter unit further includes an optical fiber harness combining the plurality of adapters on the front side of the adapter unit into one or more consolidated adapters adjacent a back side of the adapter unit.

14. The system of claim 10, further comprising a patch cable for connection with at least one of the adapters, each end of the patch cable including an optical connector and an electrical connector, the electrical connector configured to engage the contact pad of the corresponding adapter.

15. The system of claim 14, wherein the electrical connector of the patch cable comprises a pogo pin.

16. The system of claim 10, wherein each one of the plurality of contact pads has a corresponding electrical test pad located on the front side of the adapter unit.

17. The system of claim 14, further comprising an analyzer in electrical communication with the plurality of contact pads on the front side of the adapter unit via the at least one cable connector positioned adjacent the back of the housing assembly and the housing electrical connectors connected thereto, the analyzer configured to individually poll the plurality of contact pads to determine which adapters are populated by a patch cable.

18. A connector housing for a communications network comprising:
a housing assembly having an interior defined by a first side panel, a second side panel, a bottom panel, and a top panel, the interior having a plurality of berths therein, and at least one of the berths;
a housing electrical connector associated with each berth, each housing electrical connector facing the front of the housing assembly for engaging an adapter unit electrical connector as an adapter unit is inserted into the berth;
guide elements for guiding and aligning the housing electrical connectors with the respective adapter unit connectors as the adapter units are inserted into the berth, the guide elements allowing blind mating of the housing electrical connectors and the adapter unit connectors;
at least one cable connector positioned adjacent a back of the housing assembly, the cable connector in electrical communication with and consolidating electrical contacts from at least two housing electrical connectors; and
a first sub-assembly positioned within the housing assembly adjacent one of the top panel and the bottom panel, the first sub-assembly comprising a ceiling panel defining a first guide surface and the first sub-assembly supporting the housing electrical connectors facing the front of the housing assembly, and further supporting the at least one cable connector positioned adjacent the back of the housing assembly,
wherein cables, coupling the housing electrical connector and the at least one cable connector positioned adjacent the back of the housing assembly, are concealed by the ceiling panel such that the cables are protected between the ceiling panel of the sub-assembly and the top panel of the housing assembly.

19. The connector housing of claim 18, wherein the guide elements comprise pins and the first sub-assembly includes a plurality of the pins protruding from the first guide surface.

20. The connector housing of claim 19, further comprising a second sub-assembly positioned within the housing assembly, the second sub-assembly defining a second guide surface and having another plurality of the pins protruding therefrom; wherein the first guide surface, second guide surface, and pins define the berths and are configured to guide and align adapter units as they are inserted into the berths.

21. The connector housing of claim 20, wherein the first sub-assembly is positioned adjacent the top panel and the second sub-assembly is positioned adjacent the bottom panel such that the ceiling panel of the first sub-assembly defines a ceiling and the second guide surface of the second sub-assembly defines a floor, and wherein cables extending between the connectors are positioned above the ceiling, between the ceiling and the top panel.

* * * * *